(12) United States Patent
Pantoja

(10) Patent No.: US 8,375,084 B2
(45) Date of Patent: Feb. 12, 2013

(54) ONLINE SYSTEM AND METHOD FOR QUALITY ASSURANCE TESTING OF HIGH DEFINITION VIDEO DISCS AND SIMILAR MEDIA

(75) Inventor: Paulette Pantoja, Burbank, CA (US)

(73) Assignee: Blu-Focus, Burbank, CA (US)

( * ) Notice: Subject to any disclaimer, the term of this patent is extended or adjusted under 35 U.S.C. 154(b) by 139 days.

(21) Appl. No.: 13/036,992

(22) Filed: Feb. 28, 2011

(65) Prior Publication Data

US 2011/0149083 A1 Jun. 23, 2011

Related U.S. Application Data

(63) Continuation-in-part of application No. 12/383,113, filed on Mar. 19, 2009, now abandoned.

(51) Int. Cl.
*G06F 15/16* (2006.01)
*G06F 17/30* (2006.01)
*H04N 17/00* (2006.01)

(52) U.S. Cl. ........ 709/204; 709/205; 709/217; 709/218; 709/219; 709/225; 707/608; 705/300; 705/301; 726/26; 726/27; 726/28; 726/29; 348/180

(58) Field of Classification Search .......... 709/217–219, 709/225, 204, 205; 707/608; 705/300–301; 726/26–29; 348/180
See application file for complete search history.

(56) References Cited

U.S. PATENT DOCUMENTS

| | | | |
|---|---|---|---|
| 2003/0046548 A1* | 3/2003 | Brown et al. | 713/182 |
| 2004/0199578 A1* | 10/2004 | Kapczynski et al. | 709/203 |
| 2005/0204019 A1* | 9/2005 | Flynn et al. | 709/219 |
| 2005/0286382 A1* | 12/2005 | Okamoto | 369/59.1 |
| 2006/0271640 A1* | 11/2006 | Muldoon et al. | 709/217 |
| 2007/0106419 A1* | 5/2007 | Rachamadugu | 700/188 |
| 2007/0156594 A1* | 7/2007 | McGucken | 705/51 |
| 2007/0266170 A1* | 11/2007 | Mockett | 709/231 |
| 2008/0044159 A1* | 2/2008 | Vandewater et al. | 386/96 |
| 2008/0092182 A1* | 4/2008 | Conant | 725/109 |
| 2008/0109851 A1* | 5/2008 | Heather et al. | 725/60 |
| 2008/0288914 A1* | 11/2008 | Schmitter | 717/101 |
| 2009/0070587 A1* | 3/2009 | Srinivasan et al. | 713/176 |
| 2009/0106847 A1* | 4/2009 | Krupman et al. | 726/26 |
| 2010/0106805 A1* | 4/2010 | Sands et al. | 709/219 |
| 2010/0169779 A1* | 7/2010 | Mason et al. | 715/717 |

* cited by examiner

*Primary Examiner* — Alina N. Boutah
(74) *Attorney, Agent, or Firm* — Niro, Haller & Niro

(57) ABSTRACT

An online quality assurance system and method for optical disc formats with enhanced interactivity features is disclosed. Specifically, the system and method provides a means for various studios, dvd player manufacturers, dvd standards specification providers, authoring facilities, and dvd standards tool developers to each provide and receive input, preferably in realtime, about research, development, and production issues, problems and solutions.

3 Claims, 4 Drawing Sheets

Fig. 3

From: info@blufocus.com
Sent: Thursday, March 20, 2008 4:32 AM
To: paulette@blufocus.com
Subject: Message From BluFocus Online Reporting System - Issue DEetails This email was generated automatically by the BluFocus online Reporting System on the request of Sample Tester, who would like to direct your attention to the following issue:

Client: FOX
Title: Die Hard 1
SKU: US
Test Case: Menu Navigation
Issue: Some summary notes for issue
Severity: Low
Status: Check
Category: Menu
Type: Subtitles
Owner: Panasonic
Notes: Other non-specific notes If you have a BluFocus ORS account, please log on at https://ors.blufocus.com/ors to view this issue. If you don't have a BluFocus ORS account, please contact BluFocus at (818) 220-6670.

Fig. 4

BLU-RAY TESTING REPORT
DATE

| PROJECT DETAILS | | | | | | | |
|---|---|---|---|---|---|---|---|
| Client: | Fox | Title: | Lady & the Tramp | SKU: | USA | Client Contact: | |
| Authored By: | PHL | Menus By: | Drissi | Notes (if any): | | | |

| TEST CASE DETAILS | | | | | | | |
|---|---|---|---|---|---|---|---|
| Test case Status: TESTING | | | | | | | |
| Type | Menu | Description: | Menu Build#1 | Started: | 2/24/2008 | Media Type: | BD-R |

Created by: BluFocus
818-847-2120
testing@bluflocus.com

#1

| ISSUE DETAILS | | | | | | | |
|---|---|---|---|---|---|---|---|
| Issue Status: RESOLVED | | | | | | | |
| Severity: | Low | Category: | Client Spec | Type: | Video | Run Time: | 1:03:04 |
| A/V Receive: | Onkyo 650 | Audio Set Up: | Component | Video Set up: | HDMI | TV Manufacture: | Panasonic |
| TV Model: | | TV Resolution: | 1080p | TV Type: | Plasma | Owner: | Panasonic |

ISSUE SUMMARY

STEPS TO REPRODUCE

CURRENT NOTES

By:
Date:

| PLAYER TESTING | | | | | |
|---|---|---|---|---|---|
| Manufacture: | Model | Firmware | Notes | Updated By | Date/Time |
| Panasonic | BD-30 | 100.001 | Works OK | Pantoja | 3/18/08 10:30pm |
| Pioneer | 95FD | 200.0203 | Issue | Pantoja | 3/18/08 10:30pm |
| Sony | PS3 | 2.9 | Issue exists as described above | Pantoja | 3/18/08 10:30pm |

ISSUE HISTORY

As is please list of the history.

Quick Note (Not part of ORS)

ONLINE SYSTEM AND METHOD FOR QUALITY ASSURANCE TESTING OF HIGH DEFINITION VIDEO DISCS AND SIMILAR MEDIA

RELATED APPLICATION INFORMATION

This application is a continuation in part of copending U.S. application Ser. No. 12/383,113, filed Mar. 19, 2009, and further claims priority to provisional application No. 61/070,265, filed Mar. 21, 2008.

FIELD OF THE INVENTION

The present invention relates generally to a testing system and method for the quality assurance of high definition video media, such as Blu-Ray digital video discs. Specifically, the invention teaches a system and method which verifies all of the necessary specifications of a blu-ray title through the use of one or more client profile specifications, as well as the project/title specifications for a given Blu-ray disc.

The invention further teaches a computerized system and method for automatically generating and modifying a comprehensive test plan by applying any client profile specification(s) against the details contained in any specifications for any project and/or title. The invention further provides a mechanism whereby the test plan may be reviewed, and modifications and additional test cases can be made to the Test Plan. Once review and modifications are complete, the test plan is then published to the system—and is available for test plan execution.

BACKGROUND OF THE INVENTION

With the onslaught of high definition television, there is an accompanying increase in the demand to provide high content and more complex content. One of the most ubiquitous formats for viewers to consume such high definition content is digital video discs (DVDs). Recently, the consumer electronics industry has settled upon a single format for high definition video discs, the so-called Blu-ray format developed by Sony.

Blu-ray offers advanced interactive features, vastly increased video and audio options, and the inherent flexibility and complexity of BD-Java, it is now necessary more than ever to ensure quality before releasing Blu-ray products to the market. The previous simple testing methodologies and processes used for DVD production were applied to Blu-ray. These test proved to be ineffective; thus causing negative effects on consumer perception of the format, increased costs for Studios and delayed production timelines.

The complexities of Blu-ray have also created new demands, such as expanding the number of people and organizations involved in the production of a title. For instance, a given title may include multiple video formats (e.g., for different world regions), multiple audio formats (e.g., different languages) and multiple additional features (e.g., game content, commentary and/or internet connectivity). Each of these features may incorporate different content providers and/or different standards for quality assurance. Thus, there is a need for increased project communication and circulation of the supporting specifications' documents for the studio and the title. Studio specifications are evolving to include the expanded features of blu-ray, and title specifications change throughout production and often lack the detail for the advanced features or BD-Live content. Need for the current and detailed specifications are a requirement for accurate and complete testing.

The BD-J titles which are example products resulting from the use of the present invention are in fact "applications" that reside on the disc, and therefore require software-testing methodologies, which provide accurate and thorough testing to ensure correct operation and compatibility. Proper testing, reporting and management will ultimately assist all parties involved, giving enough time for updates without impacting cost and production schedules. Blu-ray development is within a fast paced and time sensitive industry. It is extremely necessary that proper testing is done; efficiently and accurately.

Software testing must be applied to Blu-ray titles since BD is not like DVD. Our goal is to increase the applied quality standards for Blu-ray.

The creation of a de facto standard is expected to increase demand for such higher definition discs, as well as an increased demand for a variety of additional content and connectivity. Blu-ray authored content is becoming more unique and complex as Creative vendors and Authoring Facilities are re-thinking the DVD design and developing new functionality. For instance, there is believed to be an increased demand for features such as game content (though a BD-J enable game), picture in picture features, and internet connections (though a BD-Live feature). In other words, while it is becoming a de facto standard, Blu-ray is and will be a constantly evolving format thanks to Java and other enhanced features. Titles will not become like standard DVD solutions, using cookie cutter format templates. Each title will be unique and complex.

As with any format, it is important that accurate and thorough testing is completed to ensure correct operation and compatibility. There is a need for efficient troubleshooting, reporting and management to give enough time for investigation and for revisions to be made without unduly impacting cost and production schedules for a variety of entities along the production process, including:
Studios
Player Manufacturers
Blu-ray Specification changes/updates
Authoring Facilities
Blu-ray tool developers High definition DVD production is a fast paced and time sensitive industry. It is extremely necessary that testing is done efficiently and accurately to avoid negative impact on the production schedule.

Many present solutions incorporate a monolithic model that assumes a "cookie cutter" approach to the release of a given DVD. Current facilities are only involved at the last stages of production. These solutions are typically built with an assumption that the underlying business processes are static and will not change, e.g., to allow for differences in functionality including, but not limited to gaming, internet connectivity and the like. As a result, these present solutions are inherently limited, and lack the ability to offer feedback on the testing requirements, feedback, and solutions reached by each stage of the development process.

Current products and systems for managing DVD quality assurance are generally unable to provide the flexibility, performance, and robustness required to manage truly effective quality assurance reporting systems that provide the best and most cost effective production schedule for studios, DVD player manufacturers, authoring facilities, tool developers, and standards authorities.

SUMMARY AND OBJECTS OF THE INVENTION

It is an object of embodiments of the present invention to provide a system that allows for on-line quality assurance process to identify and troubleshoot high definition DVD research & development and Production associated with disc authoring and players, preferably on a realtime basis.

Another object of some of the preferred embodiments of the present inventions is to provide an on line reporting system to ensure the overall quality and playability of high definition DVD titles, by working on line directly with groups during production and/or the research and development phases to provide unique solutions previously unavailable to the DVD industry.

It is a further object of embodiments of the present invention to provide a system and method for the automatic and selective realtime notification of authoring facilities, studios, player manufacturers and other participating entities of relevant troubleshooting problems, solutions and other quality assurance information.

A system and method for providing an online reporting system for use in the quality assurance of optical disc formats with enhanced interactivity features (e.g., so called Blu-ray DVD discs with BD-J or BD-Live capability) is described.

The system of the present invention typically includes one or more client computers which generates development and/or production influencing events, which are then sent to a server computer. The server computer, depending upon the identity of the client, presents a variety of options (e.g., in one or more pull down menus) which allow the client to upload and/or input information related to relevant development and/or production influencing events. The server computer of the present invention then stores or receives and places such input or uploaded information on a database which, depending upon the information received from the client computer, may direct the information to other clients for notification of the uploaded/input event information.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements, and in which:

FIG. 3 is an example automatic notice of a design and/or production issue which may be forwarded to selective clients in accord with certain preferred embodiments of the present invention; and FIG. 4 is an example of a testing report which is used to document a design and/or production issue in accord with the process and system of certain preferred embodiments of the present invention.

DESCRIPTION OF THE PREFERRED EMBODIMENTS

In the following description, for purposes of explanation, numerous specific details are set forth in order to provide an understanding of the present invention. It will be evident, however, to one skilled in the art that the present invention may be practiced without certain specific details. In other instances, well-known structures and devices are shown in block diagram form to facilitate explanation. The description of preferred embodiments is not intended to limit the scope of the claims appended hereto. In addition, future and present alternatives and modifications to the preferred embodiments described below are contemplated. Any alternatives or modifications which make insubstantial changes in function, in purpose, in structure, or in result are intended to be covered by the claims of this patent.

Figure 1:
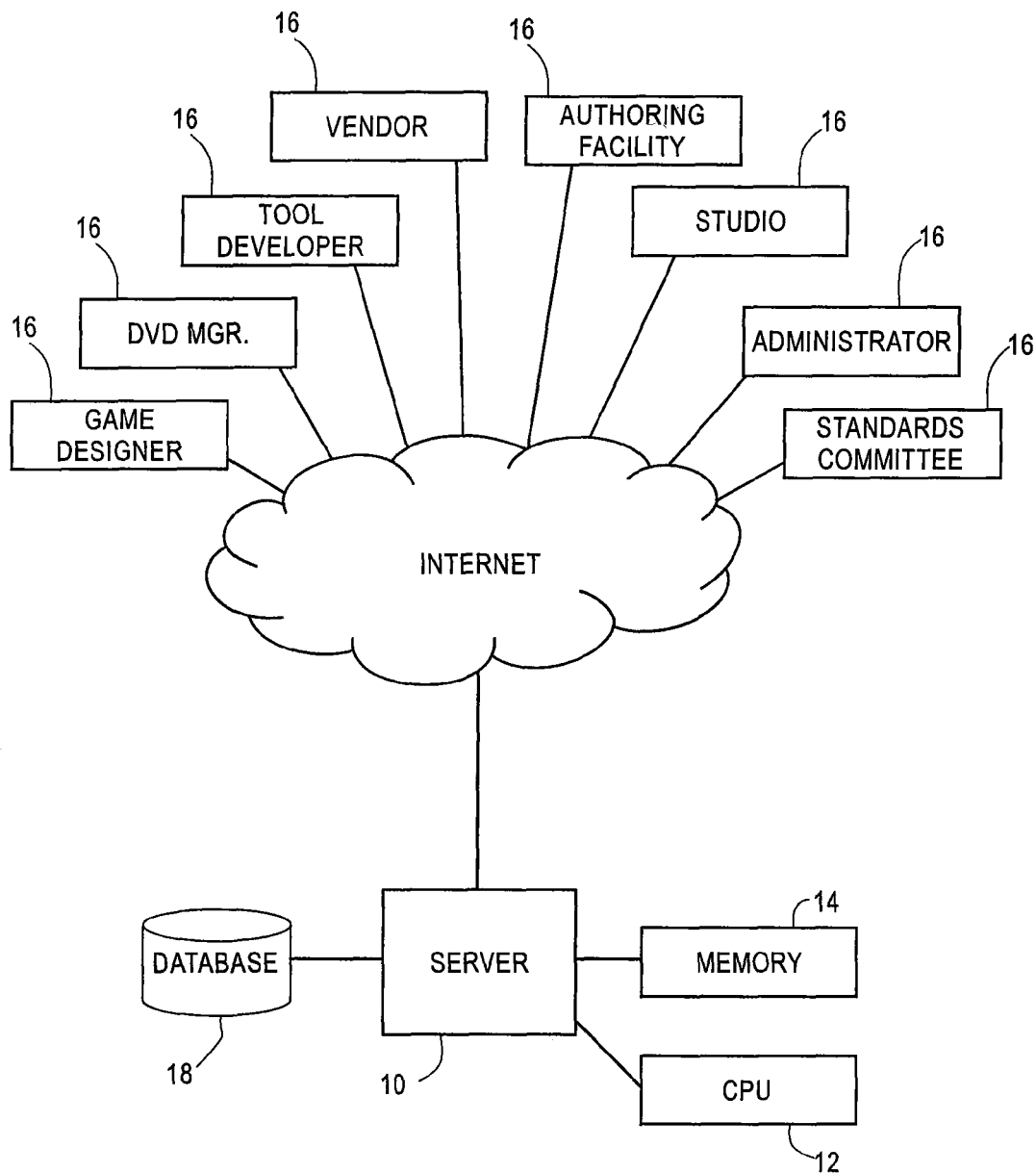
FIG. 1 illustrates a computer network that includes client computers coupled to a server computer, and that is used to implement embodiments of the present invention.

As shown in FIG. 1, the system embodiments of the present invention may be implemented on one or more computers comprising a computer network. According to one embodiment of the present invention, a server computer 10 transmits and receives data over a computer network. The steps of accessing, downloading or uploading, and manipulating the data, as well as other aspects of the present invention are implemented by a central processing unit (CPU) 12 in the server computer 10 executing sequences of instructions stored in a memory 14. The memory may be a random access memory (RAM), read-only memory (ROM), a persistent store, such as a mass storage device, or any combination of these devices. Execution of the sequences of instructions causes the CPU to perform steps according to embodiments of the present invention.

Information may be uploaded or input into to the server computer 10 from one or more other computer systems over a network connection. For example, a client computer 16 may transmit data to the server computer in response to development and/or production influencing events. As the server receives the upload or input over the network connection, it stores the information in memory. The server may store the information for updating a database 18 in memory 14, and it may automatically output updates or alerts to one or more client computers depending upon the nature of the information the server computer 10 receives. In some cases, the event information may not be directly executable by the CPU, and may instead be executed by a rule set (not shown) that interprets the input and forwards information to select client computers depending upon the rights of various client computers and/or the selection by various clients to receive such automatic notification. In other embodiments, hardwired circuitry may be used in place of, or in combination with, software instructions to implement the present invention. Thus, the present invention is not limited to any specific combination of hardware circuitry and software, nor to any particular source code for the instructions executed by the server or client computers.

Figure 2:
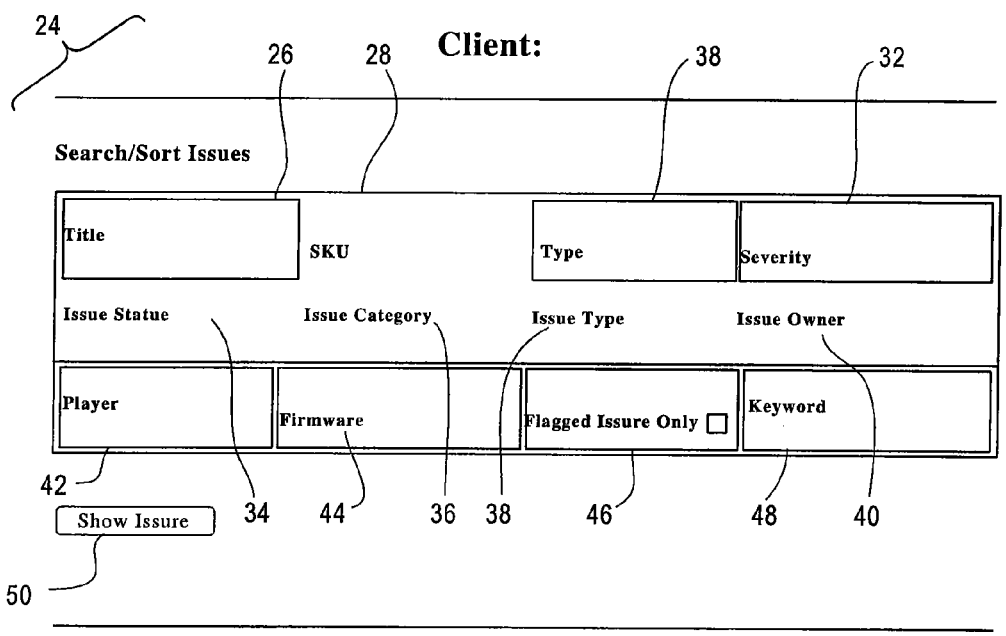
FIG. 2 is an example graphic user interface for a client accessing the computer network that implements embodiments of the present invention.

FIG. 2 shows a graphic user interface for various client computers. Prior to accessing this GUI, the client would be expected to provide and identification and password to a login screen (not shown) to maintain the security of the computer network. Once the password and login have been validated by the server computer, the server enables a client GUI 24 to be displayed to a client computer 16. The client GUI 24 includes a series of input points/pulldown menus for "search/sort" issues which allow the client to search for a given issue and/or search or organize relevant titles based upon a number of criteria, such as title 26, SKU 28, DVD type 30, severity of issue 32, issue status 34 (e.g., open, closed, verified OK, check, pending), issue category 36 (e.g., logic, navigation, linears, games, compatibility, bonus content), issue type 38 (e.g., video, audio, subtitles, graphics, functionality, UOPS, loading), issue owner 40, (e.g., client, video vendor, audio vendor, game vendor, authoring vendor, menu vendor, player division) player type 42, and firmware type 44, as well as a highlight box 46 to check for flagged issues and a keyword box to enable a plain text and/or boolean type search for descriptive text within the various entries in database 18. Those of ordinary skill in the art having the teaching of the present invention and an understanding of html or similar programming will understand how to enable the pull down menus and input boxes of the client GUI 24. Upon entry of the desired information to be searched and/or sorted, the client will click activation button 50 ("show issues") which will sort and/or look for the appropriate titles and/or issue records to be displayed. The client GUI 24 will preferably also include a display area 52 which will display the applicable records in response to the client's input search, or absent any search will display a default list (e.g., any open issues for titles associated with the particular client). For example, if a client wanted to see issues that were limited to the following categories:

Status: OPEN
Owner: Authoring
Severity: Medium
Category: Linears
Type: Subs

Then the client could simply choose the above from drop down lists and click the activation button 50 and it would list the issues responsive to the selected categories in display area 52. In a preferred default display of an issue in display area 52 the below should preferably be listed automatically:

Check Box (this is so a user can check on this and at the bottom chose to EMAIL the issues checked)
Issue Status
Issue Owner
Issue Severity
Issue Category
Issue Type
Issue Summary An example of an issue list for display area 52 would be as follows:

|  | Status | Owner | Severity | Category | Type | Outline/Summary |
|---|---|---|---|---|---|---|
| CHECK BOX HERE | Open | Authoring | High | Linears | Subs | When watching the movies, it freezes at 01:03:04 |

In one alternative preferred embodiment, next to each issue displayed in a display area would be a check box where the client could check off as many issues as the client deems relevant have such issue listings places in an email for the client to send. As would be understood by those of ordinary skill in the art, this feature would include an email button (not shown) be at the bottom of the list of issues to be displayed in display area 52.

In another alternative embodiment, the client GUI 24 will enable the entry of additional text to create a new issue record entry for the data base in response to development and/or production influencing events with a given client. Such events may include the entry of a new title with corresponding SKU, type, vendor information, and problems (if any). Likewise, the new entry may be linked or associated with an existing title, or may be the addition to or modification of an existing issue with a given title. In such instances, the client GUI 24 will permit the entry of text in display area 52 which will provide any relevant information related to the development and/or production influencing events. In addition, the display area 52 will include a feature for linking files or other records related to the development and/or production influencing event which may be stored on data base 15 and/or shared with other clients.

In one preferred embodiment of the present invention, the client GUI 24 will include enable an administrator identity which will grant the administrator client additional rights to configure and link the information passed by the network. For instance, the administrator can establish various levels of rights which may limit a given client (e.g., content author and/or player manufacturer) to only those titles for which they are involved. In addition, the administrator may enable rules either on its own or in response to client input which enables the automatic forwarding of information to other clients based upon their relatedness to a given development and/or production issue. For instance, a given client may want to know about any production problems with every title that it has worked on and thus may want to automatically receive notices from any other client related to that title. Other clients for a given title may not be concerned about any issues that for which a vendor has claimed responsibility and, thus, may "opt out" of such automatic notices. At least one preferred embodiment of the present invention will include a series of rules (not shown) which are incorporated into the server computer 12 in response to the grant of rights of the administrator and the preferences of each given client.

In a further alternative embodiment of the present invention, the administrator could establish different levels of rights for having access to different levels of information, as well as different rights to change or add to such information. For instance, the administrator could establish the following different rights levels for use of the client GUI 24:

DVD Tester—Access to view/change all
Studio—Access to view all but change only
  Issue Status
  Issue Owner
  Issue Severity
  Issue Notes
Vendor—Access to view only their issues (Authoring, Game, Audio, Video) and only change:
  Issue Notes
Guest—Access to only view issues but not change anything. But Guest will be granted to only view what is selected for them (e.g., title by a particular studio, or issues that are related to only a certain player, etc,).

With this alternative embodiment, the system and method would permit the administrator to have complete control over the transmission of issues to a plurality of different third party client computers, with each client computer having a differing level of access to view and modify issues depending upon their rights.

This server computer 10 and database 18 as used in this system may also enable a variety of additional functions, including a "knowledge trend flow chart," a reporting output document feature, and a post production release feedback mechanism via a computer website version of the client GUI 24.

Most preferably, the Consumer website would be a mechanism for a client GUI 24, where consumers can log on (after account set up) and submit any issue they are experiencing with a title they have purchased. The computer network administrator can monitor the issues entries by consumers, which are entered in a similar fashion to other client GUI entries. When a particular title has raised enough concern (either by number or issues or severity or combination of both), the administrator will launch an investigation and test on that title. If found to be need, the administrator will facilitate the creation of a test report which will then be sent to the studio and/or DVD player manufacturer regarding the issue. This reinforces the belief for consumers that there is an oversight process for monitoring and addressing their issues and for speaking directly about such issues with the studios and player manufacturers. (currently, by contrast, consumers must contact the studios and DVD player Manufacturers directly either by email or 800 number).

Most preferably, the information received from each of the client GUIs 24 will be stored in database 18 and will be accessible to a given client GUI via licensing. Within this license, reporting can be done to view issues based on title, player, region, location, and the like. Ideally, any information entered on the form and registration process of client GUI 24 will be accessible to whomever licenses the reporting membership. This system capability will provide an understanding of what types of players, firmware and titles have issues, and assist studios, authoring companies and player manufacturers when developing new products.

While in one preferred embodiment the information stored in database 18 will be used for issues arising with titles during development and production, another alternative embodiment of the present invention will include using the issue information stored in database 18 to be used by studios, DVD player manufacturers and the like for their predictive capabilities in future title projects The server computer 12 will be able to process historical information from database 18, to generate charts, graphs, and statistical analysis. For instance: upon receipt from a query from a given client GUI 24, server 12 and database 18 could generate and supply information identifying the frequency of a type of issue occurrence for a given DVD player for a given regions titles provided by a given studio during a given time period, e.g., the number of Audio issues occurred on the Panasonic BD-30 for Region A titles by FOX during the timeframe of Jan. 1, 2008-Mar. 1, 2008.

Additional optional features that may be included in certain preferred embodiments of the present invention include a contact management system, a project outline and workflow management system, and an asset tracking system. In the contact management system, the server, though information and details on clients and their contact information, would be capable of associating with actual tests of interest and be able to email issues and related test of issues that are of interest directly to such clients. A project outline and workflow feature could—using the server computer 12 in conjunction with historical information in database 18, create estimates for when projects should be completed and submitted for testing, as well as monitoring and comparing such time estimates with actual development and/or production times as well to report production issues and successes. Additionally, the database 18 can receive, store and automatically provide tracking information for assets (e.g., production DVD copies) delivered to a given client facility (e.g., from receiving barcode information from a client GUI 24 or its barcode scanner equivalent). The database 18 can thus track assets (and automatically notify clients, where desired), and identify assets attached to certain projects and test cases. Finally, the server computer 12 and database 18 in certain preferred embodiments may host and manage documentation regarding a given client's specifications along with an approval and rejection option for the client. With this feature, a given client may upload new specifications or approve ones uploaded by another client facility. The purpose of this feature would be to ensure that the testing facility always has the latest and correct specification when testing.

In the foregoing, a system has been described for deploying and managing an on line quality assurance reporting system for high definition DVDs with variable enhanced features. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarding in an illustrative rather than a restrictive sense.

What is claimed is:

1. A system for producing optical discs with at least one video program and one enhanced content program wherein the enhanced content is related to the video program, said system comprising:
   a) memory;
   b) a server connected to the memory, the server capable of receiving inputs from a plurality of remote third party client computers;
   c) video testing and status information for the video program located on the memory;
   d) enhanced content testing and status information for the enhanced content program related to the video program, the enhanced content testing and status information located on the memory;
   a database for providing the video testing and status information and the enhanced content testing and status information; and
   e) an administrator computer which controls the server to selectively grant different levels of access to operators of each of the plurality of remote third party client computers, whereby the access of each operator of the plurality of third party client computers to the database is dependent upon the video testing and game testing duties of the operator;
   whereby the video testing and status information and the enhanced content testing and status information influence the design and production of optical discs with the video program and the enhanced content program, wherein the optical discs are BLU-RAY discs or high definition DVDs.

2. The system of claim 1, wherein the administrator computer directs the server to provide access to at least one third party client computer such that the third party client computer can input video design and production information to the database, thereby adding to the video testing and status information.

3. The system of claim 2, wherein the administrator computer allows the server to selectively and automatically forward updated video testing and status information to at least one of the plurality of third party client computers depending upon the level of access of the operator.

* * * * *